United States Patent [19]

Fukushima et al.

[11] Patent Number: 5,220,347
[45] Date of Patent: Jun. 15, 1993

[54] INK JET RECORDING METHOD AND APPARATUS EMPLOYING INK

[75] Inventors: Kyoko Fukushima, Kawasaki; Koromo Shirota; Shoji Koike, both of Yokohama, all of Japan

[73] Assignee: Canon Kabushiki Kaisha, Tokyo, Japan

[21] Appl. No.: 836,975

[22] Filed: Feb. 19, 1992

Related U.S. Application Data

[62] Division of Ser. No. 664,111, Mar. 4, 1991, abandoned.

[30] Foreign Application Priority Data

| Mar. 6, 1990 | [JP] | Japan | 2-053951 |
| Mar. 6, 1990 | [JP] | Japan | 2-053952 |
| Feb. 6, 1991 | [JP] | Japan | 3-035010 |
| Feb. 6, 1991 | [JP] | Japan | 3-035011 |

[51] Int. Cl.⁵ .................... B41J 2/01; B41J 2/05
[52] U.S. Cl. ..................... 346/1.1; 346/140 R
[58] Field of Search ............. 346/1.1, 140 R, 75; 106/20, 22, 20 R, 20 D

[56] References Cited

U.S. PATENT DOCUMENTS 5,059,246 10/1991 Yamamoto et al. .......... 106/22

FOREIGN PATENT DOCUMENTS

| 0070504 | 1/1983 | European Pat. Off. . |
| 55-29546 | 3/1980 | Japan . |
| 56-57862 | 5/1981 | Japan . |
| 59-155464 | 9/1984 | Japan . |
| 63-152680 | 6/1988 | Japan . |

OTHER PUBLICATIONS

Derwent Abstract (WPIL) No. 88-216739 with respect to Japanese Patent Document No. 63-152680 (Jun. 25, 1988).

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

An ink-jet recording method and apparatus using an aqueous ink that comprises a recording agent and a liquid medium for dissolving or dispersing the recording agent, the ink comprising a compound represented by the general formula (I) or (II):

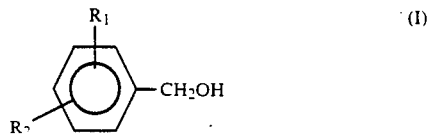

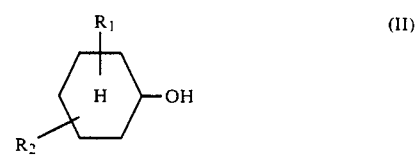

wherein $R_1$ and $R_2$ are independently selected from the group consisting of radicals of hydrogen, alkyl or alkoxy having not more than 10 carbons, sulfonic acid or salts thereof, nitro, hydroxyl, carboxyl, and amino or derivatives thereof, and $R_1$ and $R_2$ are not simultaneously a hydrogen radical.

14 Claims, 3 Drawing Sheets

INK JET RECORDING METHOD AND APPARATUS EMPLOYING INK

This application is a division of application Ser. No. 07/664,111, filed Mar. 4, 1991, now abandoned.

BACKGROUND OF THE INVENTION

1. Field of the Invention

The present invention relates to an ink, an ink-jet recording method employing the ink, and an instrument employing the ink. More particularly, the present invention relates to an ink, an ink-jet recording method, an ink-jet recording unit, an ink-jet recording apparatus, and an ink cartridge which allow recording in high resolution and high quality not only on coated paper prepared specially for ink-jet recording but also on non-coated ordinary paper generally used in offices and homes such as copying paper, reporting paper, notebook paper, letter paper, bond paper, continuous business form paper, and the like.

2. Related Background Art

Various compositions of inks have been reported for ink-jet recording. In recent years, research and development has been comprehensively conducted regarding inks from various aspects of compositions and physical properties of inks for the purpose of achieving satisfactory recording on ordinary paper such as copying paper, reporting paper, notebook paper, letter paper, bond paper, continuous business form paper, and the like.

Conventional inks generally contain a high-boiling organic solvent like glycol for retardation of premature drying and prevention of clogging of ink. If such an ink is used for recording on highly sized ordinary paper, the ink does not readily permeate into the interior of paper and does not dry rapidly, which causes insufficient fixation of ink, and which results in inconveniences such as staining of a finger and blurring or scratching of letters upon touching a recorded matter.

To offset the inconvenience, Japanese Patent Application Laid-Open No. 55-29546 discloses a method of adding a large amount of surfactant to the ink to increase permeability of ink into the interior of paper. In this case, however, troubles are encountered such as frequent occurrence of running or feathering of ink depending on the kind of paper; and retardation of ink ejection in ink-jet recording caused by backward movement of ink from the orifice-outlet face, or wetting of the entire orifice-outlet face depending on the structure of the head.

Further, Japanese Patent Application Laid-Open No. 56-57862 discloses a method of making the pH of ink strongly alkaline. Such an ink is disadvantageous in that the ink is dangerous to humans when touched with a finger and the ink is unsatisfactory in occurrence of feathering and insufficiency of drying property on paper employing a certain kind of sizing agent, e.g., neutralized paper.

In spite of the aforementioned and other improvements, no ink is known that is free from the problems of feathering, lack of drying property, danger to humans, and occurrence of clogging and so forth.

SUMMARY OF THE INVENTION

An object of the present invention is to provide an ink that is free from the problems of feathering of ink and delayed drying of recorded matters, and that provides high quality printing on non-coated paper or ordinary paper such as copying paper, reporting paper, notebook paper, letter paper, bond paper, continuous business form paper, etc., that is generally used in offices and elsewhere. Further objects include an ink-jet recording method and an ink-jet apparatus employing the ink.

Another object of the present invention is to provide an ink for ink-jet printing that is sufficiently safe for use in offices and homes.

A further object of the present invention is to provide an ink that does not tend to clog nozzles of ink-jet heads and is highly reliable.

According to an aspect of the present invention, there is provided an ink comprising a recording agent and a liquid medium for dissolving or dispersing the recording agent, the ink comprising a compound represented by the general formula (I) or (II):

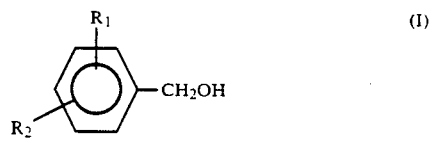

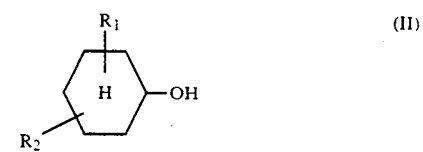

where $R_1$ and $R_2$ are independently selected from the group consisting of radicals of hydrogen, alkyl or alkoxy having not more than 10 carbons, sulfonic acid and salts thereof, nitro, hydroxyl, carboxyl, and amino or derivatives thereof, and $R_1$ and $R_2$ are not simultaneously hydrogen radical.

According to another aspect of the present invention, there is provided an ink-jet recording method of conducting recording by ejecting ink droplets through an orifice onto a recording medium in response to a recording signal, wherein the above-mentioned ink is employed.

According to still another aspect of the present invention, there is provided a recording unit having an ink container portion for holding an ink and a head portion for ejecting the ink in droplets, wherein the above-mentioned ink is employed.

According to a further aspect of the present invention, there is provided an ink cartridge having an ink container portion for holding an ink, wherein the above-mentioned ink is employed.

According to a still further aspect of the present invention, there is provided an ink-jet recording apparatus having an ink container portion for holding an ink and a head portion for ejecting the ink in droplets, wherein the above-mentioned ink is employed.

According to a still further aspect of the present invention, there is provided an ink-jet recording apparatus having a recording head for ejecting ink in droplets, an ink cartridge having an ink container portion for holding ink, and an ink-supplying portion for supplying ink from the ink cartridge to the recording head, wherein the above-mentioned ink is employed.

DESCRIPTION OF THE PREFERRED EMBODIMENTS

Figure 1A:
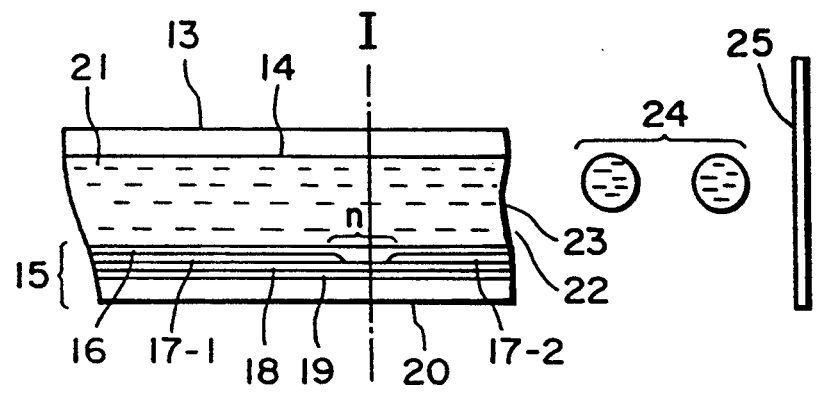
FIG. 1A, and FIG. 1B are respectively a vertical cross-sectional view and a lateral cross-sectional view of a head portion of an ink-jet recording apparatus.

The inventors of the present invention have made comprehensive investigations with respect to compositions of inks to prevent feathering of ink and to improve drying property and permeability of ink on ordinary paper. Consequently, the inventors found that the ink containing the compound represented by the general formula (I) or (II) shown above is well-balanced in feathering and permeation of the ink, being not adversely affected in anti-clogging property, and being reliable without causing a problem in safety, and have accomplished the present invention.

According to the investigation of the inventors regarding feathering and permeation of ink on ordinary paper, an ink containing a surfactant as employed in conventional inks does not give invariably stable recording depending on the kind of paper, while an ink containing the compound represented by the general formula (I) or (II) gives highly satisfactorily stable recording independent of the kind of paper.

The reason is considered to be that the feathering and the permeation of ink are greatly affected by a wetting phenomenon at the interface between an ink droplet and paper. The wetting property of an ink containing a wetting agent at the surface portion of the ink droplet differs from that in the interior of the ink droplet, giving unsatisfactory results. The ink of the present invention does not tend to cause such phenomenon, and moreover, the ink of the present invention has exquisitely well-balanced affinity with a sizing agent added to the surface or interior of paper, as an ink for ink-jet for ordinary paper.

The present invention is described in more detail by reference to a preferred embodiment.

The compounds represented by the general formula (I) or (II) shown above are derivatives respectively, of benzyl alcohol or of cyclohexanol, and are obtainable by known methods.

Specific examples of $R_1$ and $R_2$ of the compounds represented by the general formula (I) and (II) are shown below. The present invention is not limited to these specific examples. In the following table, $R_1$ is at the para-position and $R_2$ is at an ortho-position relative to the hydroxyl group.

| Compound example No. | $R_1$ | $R_2$ |
| --- | --- | --- |
| 1 | $CH_3$ | H |
| 2 | $C_2H_5$ | H |
| 3 | $C_3H_7$ | H |
| 4 | $C_4H_9$ | H |
| 5 | $C_9H_{19}$ | H |
| 6 | $OCH_3$ | H |
| 7 | $OC_2H_5$ | H |
| 8 | $OC_3H_7$ | H |
| 9 | $CH_3$ | $CH_3$ |
| 10 | $CH_3$ | $C_2H_5$ |
| 11 | OH | H |
| 12 | $NH_2$ | H |
| 13 | COOH | H |
| 14 | $NHCOCH_3$ | H |

-continued

| Compound example No. | $R_1$ | $R_2$ |
| --- | --- | --- |
| 15 | OH | $CH_3$ |
| 16 | $NO_2$ | H |
| 17 | $SO_3Na$ | H |
| 18 | $C_2H_5$ | $C_2H_5$ |

The compounds represented by the above general formula (I) or (II) employed in the present invention are derived as a result of comprehensive study by selecting $R_1$ and $R_2$. The compounds having an alkyl or alkoxy group having 11 or more carbons as $R_1$ or $R_2$, for example, causes problems in feathering although it gives satisfactory permeability, and are remarkably inferior to the compounds of the general formula (I) or (II) in various properties.

The amount of addition of the compound of the general formula (I) or (II) is within the range of from 0.01% to 30% by weight, preferably from 0.1% to 10% by weight, more preferably from 0.2% to 5% by weight of the ink depending on a coloring matter used and a liquid medium component combinedly used.

The ink of the present invention is characterized by the compound represented by the general formula (I) or (II) contained therein together with a coloring matter. Additionally the ink of the present invention may contain combinedly water and ordinary organic solvent which are used in known conventional inks. The organic solvent includes alkyl alcohols having 1 to 5 carbons such as methyl alcohol, ethyl alcohol, n-propyl alcohol, isopropyl alcohol, n-butyl alcohol, sec-butyl alcohol, tert-butyl alcohol, isobutyl alcohol, n-pentanol, etc.; amides such as dimethylformamide, dimethylacetamide, etc.; ketones and ketoalcohols such as acetone, diacetone alcohol, etc.; ethers such as tetrahydrofuran, dioxane, etc.; oxyethylene or oxypropylene addition polymers such as diethylene glycol, triethylene glycol, tetraethylene glycol, dipropylene glycol, tripropylene glycol, polyethylene glycol, polypropylene glycol, etc.; alkylene glycols having an alkylene group of 2 to 6 carbons such as ethylene glycol, propylene glycol, trimethylene glycol, butylene glycol, 1,2,6-hexanetriol, hexylene glycol, etc.; thiodiglycol; glycerin; lower alkyl ethers of a polyhydric alcohol such as ethylene glycol monomethyl (or monoethyl) ether, diethylene glycol monomethyl (or monoethyl) ether, triethylene glycol monomethyl (or monoethyl) ether, etc.; lower dialkyl ethers of a polyhydric alcohol such as triethylene glycol dimethyl (or diethyl) ether, tetraethylene glycol dimethyl (or diethyl) ether, etc.; sulfolane, N-methyl-2-pyrrolidone, 1,3-dimethyl-2-imidazolidinone, and the like.

The content of the water-soluble organic solvent is generally within the range of from 2% to 50% by weight, preferably 2% to 30% by weight based on the total weight of the ink.

The above mediums may be used singly or mixedly. The preferable composition of the liquid medium is a combination of water and one or more organic solvents, the organic solvents containing at least one water-soluble high-boiling organic solvent, for example, a polyhydric alcohol such as diethylene glycol, triethylene glycol, glycerin, etc., and the like.

The recording agent constituting the ink of the present invention includes direct dyes, acid dyes, food dyes, basic dyes, reactive dyes, disperse dyes, vat dyes, soluble vat dyes, reactive disperse dyes, oily dyes, and various pigments. Among them, water-soluble dyes are particularly preferable in view of properties of the ink.

The content of the coloring matter is determined depending on the kind of liquid medium constituent, performances required to the ink, and so forth. Generally the content is in the range of from about 0.2% to 20% by weight, preferably from 0.5% to 10% by weight, more preferably from 1% to 5% by weight of the entire ink.

The main constituents of the ink of the present invention are as described above. Supplementarily, a dispersant, a surfactant, a viscosity-adjusting agent, a surface tension-adjusting agent, a fluorescent whitener, or the like may be added as an auxiliary additive to the ink, if necessary, within the range of not adversely affecting the object of the present invention.

The examples of the auxiliary additives are viscosity-adjusting agents such as polyvinyl alcohol, cellulose derivatives, water-soluble resins, etc.; various surfactants of cationic, anionic, and nonionic type; surface tension-adjusting agents such as diethanolamine, triethanolamine, etc.; pH-adjusting agents of buffer solution; mildewproofing agents, and the like.

Further, in preparation of an ink for ink-jet recording of an ink-electrification type, there is added a resistivity-adjusting agent such as inorganic salts including lithium chloride, ammonium chloride, sodium chloride, etc.

The ink of the present invention is particularly suitable for ink-jet recording of the type of ejecting ink by bubbling of ink caused by thermal energy, in which the ink is ejected extremely stably without forming satellite dots. For this use, the thermal properties (such as specific heat, thermal expansion coefficient, thermal conductivity, etc.) may be adjusted.

Further, the ink of the present invention is adjusted desirably to have, as properties of ink itself, a surface tension in the range of from 30 to 68 dyne/cm at 25° C., and viscosity of not higher than 15 cP, preferably not higher than 10 cP, more preferably not higher than 5 cP so as to solve the problems of feathering, delayed drying, and insufficient permeation in recording on ordinary paper, as well as to improve matching of the ink with the ink-jet head.

In order to control the property of the ink as above to solve problems encountered on ordinary paper, the ink of the present invention contains water preferably in an amount of from 50% to 98% by weight, more preferably from 60% to 95% by weight, still more preferably from 75% to 95% by weight.

The ink of the present invention, which is employed particularly suitably for an ink-jet recording method for recording by ejecting ink droplets by thermal energy, is naturally useful also for general writing utensils.

The methods and the apparatus suitable for the use of the ink of the present invention are those which provide thermal energy to ink in a cell in a recording head in correspondence with recording signals to form liquid droplets by the thermal energy.

Figure 1B:
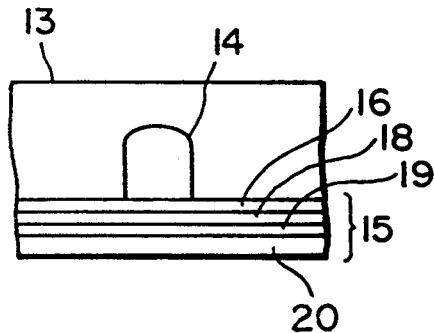
Figure 2:
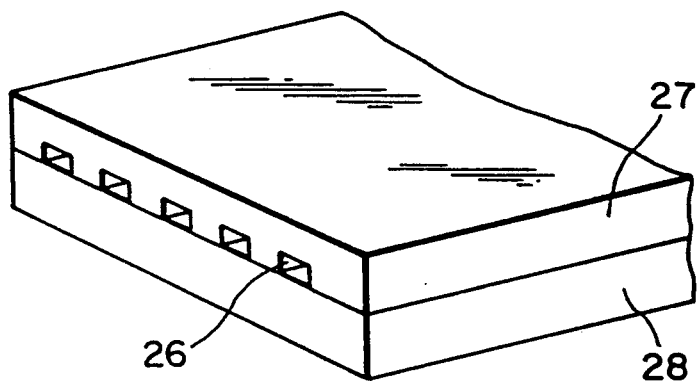
FIG. 2 is an exterior oblique view of a multiplicate form of the head of FIG. 1.

An example of the constitution of the heads, which is a main portion of the apparatus, is shown in FIG. 1A, FIG. 1B, and FIG. 2.

A head 13 is formed by bonding a plate of glass, ceramics, or plastics having a groove 14 for ink passage with a heat-generating head 15. The type of the head is not limited to the one shown in the figure. The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 having good heat-releasing property made of alumina or the like.

Ink 21 reaches to the ejection orifice 22 (a fine pore), forming a meniscus 23 by action of pressure P not shown in the figure.

On application of an electric signal to the electrodes 17-1 and 17-2, the region designated by a symbol "n" on the heat-generation head 15 abruptly generates heat to form a bubble in the ink 21 at the position adjacent thereto. The pressure generated by the bubble pushes out the meniscus 23 and ejects the ink 21, as recording droplets 24, and the ink droplets are propelled to a recording medium 25. FIG. 2 illustrates a multi-head constructed by juxtaposing a multitude of heads shown in FIG. 1A. The multi-head is prepared by bonding a glass plate 27 having a multitude of grooves 26 with a heat-generation head 28 similar to the one described in FIG. 1A.

Incidentally, FIG. 1A is a cross-sectional view of the head 13 along an ink flow path, and FIG. 1B is a cross-sectional view of the head at the line I-II in FIG. 1A.

Figure 3:
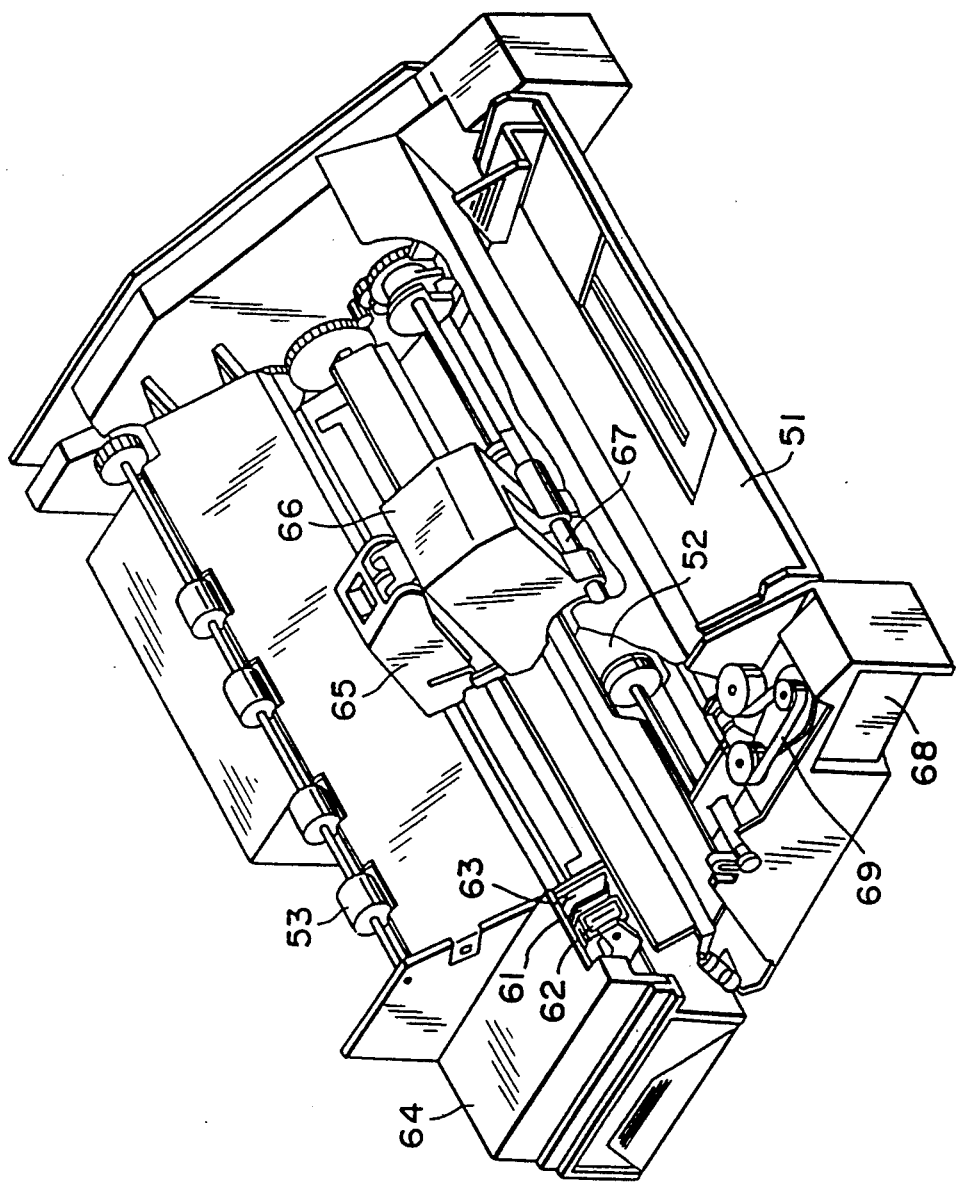
FIG. 3 is an oblique view of an ink-jet recording apparatus.

FIG. 3 illustrates an example of the ink-jet recording apparatus incorporating such a head mounted therein.

In FIG. 3, a blade 61 as a wiping member is held at its one end by a blade-holding member, forming a fixed end in a shape of a cantilever. The blade 61 is placed at a position adjacent to the recording region of the recording head, and in this example, is held so as to protrude into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62, the ink absorption member 63 constitute an ejection-recovery portion 64, the blade 61 and the ink absorption member 63 remove water, dust, and the like from the ink ejecting nozzle face.

A recording head 65 has an ejection energy generation means for ejection, and conducts recording by ejecting ink toward a recording medium opposing the ejection nozzle face having ejection outlets arranged thereon. A carriage 66 is provided for supporting and moving the recording head 65. The carriage 66 is engaged slidably with a guide rod 67. A portion of the carriage 66 is connected (not shown in the figure) to a belt 69 driven by a motor 68, so that the carriage 66 is movable along the guide rod 67 to the recording region of the recording head 65 and the adjacent region thereto.

The constitution of a paper delivery portion 51 for delivery of a recording medium and a paper delivery roller 52 driven by a motor not shown in the figure delivers the recording medium to the position opposing the ejecting nozzle face of the recording head, and the recording medium is discharged with the progress of the recording to paper discharge portion provided with paper-discharge rollers 53.

In the above constitution, the cap 62 of the ejection-recovery portion 64 is out of the moving path of the recording head 65 when the head returns to the home position upon termination of recording, etc., while the blade 61 is made to protrude into the moving path.

Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head 65 moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
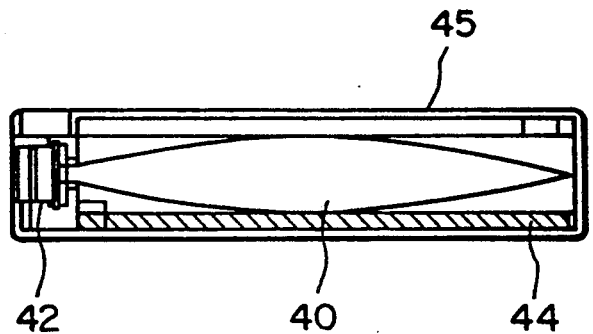
FIG. 4 is a vertical cross-sectional view of an ink cartridge.

FIG. 4 illustrates an example of the ink cartridge containing ink to be supplied through an ink supplying member such as a tube. The ink container portion 40, for example an ink bag, contains an ink to be supplied, and has a rubber plug 42 at the tip. By inserting a needle (not shown in the figure) into the plug 42, the ink in the ink container portion 40 is accessed. An absorption member 44 absorbs waste ink.

The ink container portion has preferably a liquid-contacting face made of polyolefin, especially polyethylene as in the present invention.

The ink-jet recording apparatus used in the present invention is not limited to the above-mentioned one which has separately a head and an ink cartridge. Integration thereof into one body as shown in FIG. 5 may suitably be used.

Figure 5:
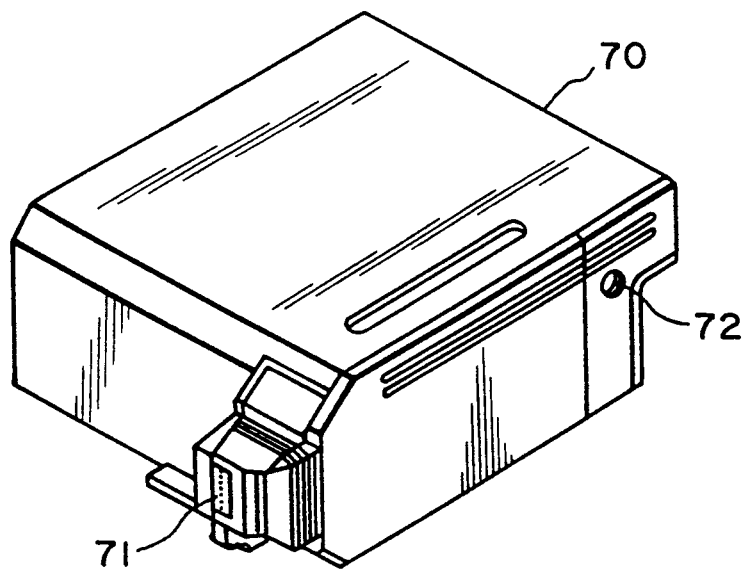
FIG. 5 is an oblique view of a recording unit.

In FIG. 5, a recording unit 70 houses an ink container portion such as an ink absorption member, and the ink in the ink absorption member is ejected from a head 71 having a plurality of orifices. The material for the ink absorption member is preferably polyurethane as in the present invention.

Air-communication opening 72 is provided to communicate the interior of the cartridge with the open air.

The recording unit 70 may be used in place of the recording head shown in FIG. 3, and is readily mountable to and removable from the carriage 66.

The present invention is described in more detail referring to examples and comparative examples. The units "part" and "%" in the description are based on weight unless otherwise mentioned.

EXAMPLES 1–5

The components below were mixed and stirred for 5 hours. The pH of the mixture was adjusted to 7.5 by adding aqueous 0.1% sodium hydroxide solution, and filtered under pressure through a membrane filter having a pore size of 0.22 μm, thereby the inks A to E of the present invention being prepared.

The resulting inks A to E were used for recording on commercial copying paper and bond paper by means of an ink-jet printer BJ-130 (trade name, made by Canon K.K.,) which employs heat generating elements as an ink-ejecting energy source. The level of the fixation and occurrence ratio of feathering (feathering ratio) of the recorded matters, occurrence of clogging at restart of printing after intermission of printing, and frequency responsiveness were evaluated. The results are shown in Table 1.

Ink A

-continued

| | |
|---|---|
| C.I. Direct Yellow 86 | 2 parts |
| Diethylene glycol | 15 parts |
| Compound example 1 of general formula (I) | 1.2 parts |
| Water | 81.8 parts |
| Ink B | |
| C.I. Acid Red 35 | 2 parts |
| Glycerin | 10 parts |
| Compound example 6 of general formula (I) | 1.8 parts |
| Ethylene glycol | 5.5 parts |
| Water | 80.7 parts |
| Ink C | |
| C.I. Food Black 2 | 3 parts |
| Triethylene glycol | 10 parts |
| N-methyl-2-pyrrolidone | 2 parts |
| Compound example 2 of general formula (I) | 1.2 parts |
| Water | 83.8 parts |
| Ink D | |
| C.I. Direct Blue 199 | 2.5 parts |
| Polyethylene glycol (molecular weight 300) | 5 parts |
| Diethylene glycol | 10 parts |
| Triethylene glycol monomethyl ether | 2 parts |
| Triethanolamine | 0.5 part |
| Compound example 14 of general formula (I) | 3.5 parts |
| Water | 76.5 parts |
| Ink E | |
| C.I. Direct Black 154 | 2 parts |
| Thiodiglycol | 6 parts |
| Diethylene glycol | 9 parts |
| Compound example 9 of general formula (I) | 1.2 parts |
| Water | 81.8 parts |

COMPARATIVE EXAMPLES 1–4

The inks F to I of Comparative examples 1 to 4 were prepared from the components below, and evaluated in the same manner as in Examples 1 to 5. The results are show in Table 1.

| | |
|---|---|
| Ink F | |
| C.I. Direct Yellow 86 | 2 parts |
| Diethylene glycol | 15 parts |
| Water | 83 parts |
| Ink G | |
| C.I. Food Black 2 | 3 parts |
| Diethylene glycol | 10 parts |
| Triethylene glycol | 10 parts |
| Nonionic surfactant (trade name: Nissan Nonion P223, made by Nippon Oil and Fats Co, Ltd.) | 0.5 part |
| Water | 76.5 parts |
| Ink H | |
| C.I. Acid Red 35 | 2 parts |
| Glycerin | 10 parts |
| Compound of general formula (I) ($R_1 = C_{11}H_{23}$, $R_2 = H$) | 1.8 parts |
| Ethylene glycol | 5.5 parts |
| Water | 80.7 parts |
| Ink I | |
| C.I. Food Black 2 | 3 parts |
| Triethylene glycol | 10 parts |
| N-methyl-2-pyrrolidone | 2 parts |
| Ethanol | 1 part |
| Water | 84 parts |

TABLE 1

| | Example No. | | | | | Comparative example No. | | | |
|---|---|---|---|---|---|---|---|---|---|
| | 1 | 2 | 3 | 4 | 5 | 1 | 2 | 3 | 4 |
| Ink | A | B | C | D | E | F | G | H | I |
| Fixation*1 | | | | | | | | | |
| Copying paper | ☻ | ☻ | ☻ | ○ | ○ | X | ☻ | ☻ | Δ |
| Bond paper | ☻ | ☻ | ☻ | ☻ | ☻ | Δ | ☻ | ☻ | ○ |
| Feathering ratio*2 | | | | | | | | | |
| Copying paper | ○ | ○ | ○ | ○ | ○ | ○ | X | X | ○ |

TABLE 1-continued

| | | | | | | | | | | |
|---|---|---|---|---|---|---|---|---|---|---|
| Bond paper | ◉ | ◉ | ◉ | ◉ | ◉ | ◯ | X | X | ◯ |
| Clogging*3 | ◯ | ◯ | ◯ | ◯ | ◯ | Δ | X | Δ | X |
| Frequency responsiveness*4 | ◉ | ◉ | ◉ | ◉ | ◉ | X | X | Δ | Δ |

*1Evaluation of fixation:
Ten seconds, and 30 seconds after the printing on commercial copying paper and bond paper, the printed portion was rubbed with filter paper (No. 5C: trade name, made by Toyo Roshi K.K.). The fixation was graded as below. The evaluation was conducted at 25° C. and 60% RH.
◉: Not blurred after 10 seconds.
◯: Slightly blurred after 10 seconds.
Δ: Slightly blurred after 30 seconds.
X: Remarkably blurred after 30 seconds.

*2Feathering ratio:
300 dots were printed discontinuously by a printer on commercial copying paper and bond paper. After one hour or more, the printed dots were examined with a microscope to count the number of dots which exhibited feathering. The ratio of occurrence of feathering was graded as below according to the percentage of the feathering dots relative to the total dots in number. The printing was conducted at the environmental condition of 25° C. and 60% RH.
◯: 10% or less.
Δ: 11 to 30%.
X: 31% or more.

*3Clogging:
"Clogging" means a clogging tendency at restart of printing after intermission of printing. The ink to be tested was filled to the printer, and printing of alphabets and numerals was conducted continuously for 10 minutes. After the printer was left standing for ten minutes without capping the nozzles, the same printing was restarted. The clogging was graded according to the presence or absence of blurring and defects of the printed letters at the restart of the printing. The evaluation was conducted at 25° C. and 60% RH.
◯: The first letter being not defective.
Δ: The first letter being partially blurred or defective.
X: The first letter not being printed out.

*4Frequency responsiveness:
The printed state of the printed matter, namely blurring, white blank, splashing, distortion, or the like of the letters resulting from the failure of the ink-shooting was observed visually, and was graded as below.
◉: The response of ink to frequency being satisfactory. No blurring, white blank, nor incorrect shooting being observed in both solid printing and character printing.
◯: The response of ink to frequency being almost satisfactory. No blurring, white blank, nor incorrect shooting being observed in character printing, but slight blurring being observed in solid printing.
Δ: No blurring nor white blank being observed and partial incorrect ink-shooting being observed in character printing. Blurring and white blank being observed in one-third of the whole solid printing area.
X: Blurring and white blank being significant in solid printing, and blurring and incorrect ink-shooting being remarkable.

EXAMPLES 6-10, AND COMPARATIVE EXAMPLE 5

The inks J to N of the present invention and the ink 0 of Comparative example were prepared from the components below in the same manner as in Example 1. The inks were evaluated in the same manner as in Example 1. The results are shown in Table 2.

| Ink J | |
|---|---|
| C.I. Direct Yellow 86 | 2 parts |
| Diethylene glycol | 15 parts |
| Compound example 1 of general formula (II) | 1 part |
| Water | 82 parts |
| Ink K | |
| C.I. Acid Red 35 | 2 parts |
| Glycerin | 10 parts |
| Compound example 6 of general formula (II) | 1.5 parts |
| Ethylene glycol | 5.5 parts |
| Water | 81 parts |
| Ink L | |
| C.I. Food Black 2 | 3 parts |
| Triethylene glycol | 10 parts |
| N-methyl-2-pyrrolidone | 2 parts |
| Compound example 2 of general formula (II) | 1 part |
| Water | 84 parts |
| Ink M | |
| C.I. Direct Blue 199 | 2.5 parts |
| Polyethylene glycol (molecular weight 300) | 5 parts |
| Diethylene glycol | 10 parts |
| Triethylene glycol monomethyl ether | 2 parts |
| Triethanolamine | 0.5 part |
| Compound example 16 of general formula (II) | 3 parts |
| Water | 77 parts |
| Ink N | |
| C.I. Direct Black 154 | 2 parts |
| Thiodiglycol | 6 parts |
| Diethylene glycol | 9 parts |
| Compound example 9 of general formula (II) | 1 part |
| Water | 82 parts |
| Ink O (Comparative example 5) | |
| C.I. Acid Red 35 | 2 parts |
| Glycerin | 10 parts |
| Compound of general formula (II) ($R_1 = C_{11}H_{23}$, $R_2 = H$) | 1.5 parts |
| Ethylene glycol | 5.5 parts |
| Water | 81 parts |

TABLE 2

| | Example | | | | | Comparative example |
|---|---|---|---|---|---|---|
| | 6 | 7 | 8 | 9 | 10 | 5 |
| Ink | J | K | L | M | N | O |
| Fixation*1 | | | | | | |
| Copying paper | ◉ | ◉ | ◉ | ◯ | ◉ | ◯ |
| Bond paper | ◉ | ◉ | ◉ | ◉ | ◉ | ◉ |
| Feathering ratio*2 | | | | | | |
| Copying paper | ◯ | ◯ | ◯ | ◯ | ◯ | X |
| Bond paper | ◯ | ◯ | ◯ | ◯ | ◯ | X |
| Clogging*3 | ◯ | ◯ | ◯ | ◯ | ◯ | Δ |
| Frequency responsiveness*4 | ◉ | ◉ | ◉ | ◉ | ◉ | Δ |

As described above, the ink of the present invention enables recording with high quality without blurring and with satisfactory fixation on ordinary paper such as copying paper, reporting paper, notebook paper letter paper, bond paper, continuous business form paper, etc. generally used in offices and elsewhere.

Further, the present invention provides an ink that is highly safe in use in offices and homes.

Furthermore, the present invention enables reliable ink jet recording without occurrence of clogging of an ink-jet nozzle, and in particular remarkably improves responsiveness of ink ejection in recording methods utilizing bubbling of ink by thermal energy for ink ejection.

The use of the ink of the present invention also increases the reliability of printing apparatus.

What is claimed is:

1. An ink-jet recording method of conducting recording comprising the step of ejecting droplets of an aqueous ink through an orifice onto a recording medium in response to a recording signal, the ink comprising a compound represented by the general formula (I) or (II):

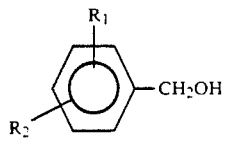

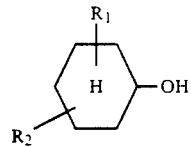

where $R_1$ and $R_2$ are independently selected from the group consisting of radicals of hydrogen, alkyl or alkoxy having not more than 10 carbons, sulfonic acid or salts thereof, nitro, hydroxyl, carboxyl, and amino or derivatives thereof, and $R_1$ and $R_2$ are not simultaneously hydrogen radical.

2. The ink-jet recording method of claim 1, wherein said recording medium is non-coated paper.

3. The ink-jet recording method of claim 1, wherein thermal energy is exerted to the ink to eject the droplets of the ink.

4. A recording unit having an ink container portion that holds an aqueous ink and a head portion for ejecting the ink in droplets, the ink comprising a compound represented by the general formula (I) or (II):

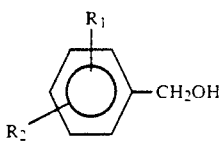

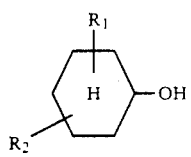

where $R_1$ and $R_2$ are independently selected from the group consisting of radicals of hydrogen, alkyl or alkoxy having not more than 10 carbons, sulfonic acid or salts thereof, nitro, hydroxyl, carboxyl, and amine or derivatives thereof, and $R_1$ and $R_2$ are not simultaneously hydrogen radical.

5. The recording unit of claim 4, wherein said ink container portion is formed from polyurethane.

6. The recording unit of claim 4, wherein said head portion comprises a head which ejects droplets of ink by exerting thermal energy to the ink.

7. An ink cartridge having an ink container portion that holds an aqueous ink, the ink comprising a compound represented by the general formula (I) or (II):

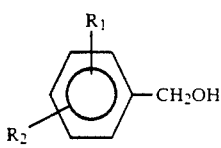

-continued

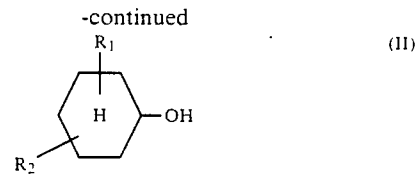

where $R_1$ and $R_2$ are independently selected from the group consisting of radicals of hydrogen, alkyl or alkoxy having not more than 10 carbons, sulfonic acid or salts thereof, nitro, hydroxyl, carboxyl, and amino or derivatives thereof, and $R_1$ and $R_2$ are not simultaneously hydrogen radical.

8. The ink cartridge of claim 7, wherein said ink container portion comprises a liquid-contacting face formed of polyolefin.

9. An ink-jet recording apparatus having an ink container portion that holds an aqueous ink and a head portion for ejecting the ink in droplets, the ink comprising a compound represented by the general formula (I) or (II):

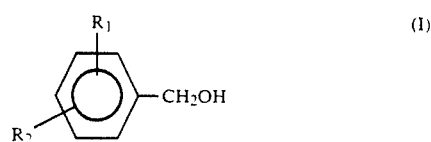

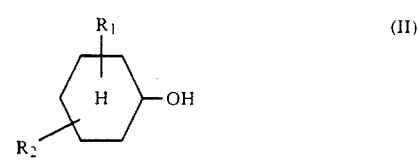

where $R_1$ and $R_2$ are independently selected from the group consisting of radicals of hydrogen, alkyl or alkoxy having not more than 10 carbons, sulfonic acid or salts thereof, nitro, hydroxyl, carboxyl, and amino or derivatives thereof, and $R_1$ and $R_2$ are not simultaneously hydrogen radical.

10. The ink-jet recording apparatus of claim 9, wherein said ink container portion is formed of polyurethane.

11. The ink-jet recording apparatus of claim 9, wherein said head portion comprises a head which ejects droplets of ink by exerting thermal energy to the ink.

12. An ink-jet recording apparatus having a recording head for ejecting ink in droplets, an ink cartridge having an ink container portion that holds ink, and an ink-supplying portion for supplying ink from the an acquired ink cartridge to the recording head, the ink comprising a compound represented by the general formula (I) or (II):

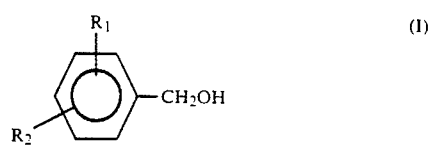

-continued

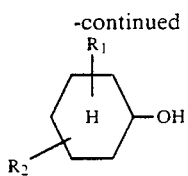
(II)

where $R_1$ and $R_2$ are independently selected from the group consisting of radicals of hydrogen, alkyl or alkoxy having not more than 10 carbons, sulfonic acid or salts thereof, nitro, hydroxyl, carboxyl or amino or derivatives thereof, and $R_1$ and $R_2$ are not simultaneously hydrogen radical.

13. The ink-jet recording apparatus of claim 12, wherein said ink container portion has a liquid-contacting face formed of polyolefin.

14. The ink-jet recording apparatus of claim 12, wherein said recording head comprises a head which ejects droplets of ink by exerting thermal energy to the ink.

* * * * *

UNITED STATES PATENT AND TRADEMARK OFFICE
CERTIFICATE OF CORRECTION

PATENT NO. : 5,220,347
DATED : Jun. 15, 1993
INVENTOR(S) : Fukushima et al.

It is certified that error appears in the above-indentified patent and that said Letters Patent is hereby corrected as shown below:

COLUMN 8:

Line 34, "show" should read --shown--.

COLUMN 12:

Line 56, "holds ink," should read --holds an aqueous ink,--; and

Line 57, "an acquired" should be deleted.

Signed and Sealed this

Twelfth Day of April, 1994

*Attest:*

BRUCE LEHMAN

*Commissioner of Patents and Trademarks*

*Attesting Officer*